United States Patent
Kang et al.

(10) Patent No.: US 11,987,704 B2
(45) Date of Patent: May 21, 2024

(54) METHOD FOR PREPARING BIODEGRADABLE LATEX COMPOSITION FOR DIP FORMING

(71) Applicant: Korea Kumho Petrochemical Co., Ltd., Seoul (KR)

(72) Inventors: Eunsoo Kang, Daejeon (KR); Jeong Weon Han, Daejeon (KR); Sung Hun Choung, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 50 days.

(21) Appl. No.: 17/851,915

(22) Filed: Jun. 28, 2022

(65) Prior Publication Data

US 2023/0054173 A1 Feb. 23, 2023

(30) Foreign Application Priority Data

Jul. 14, 2021 (KR) .......................... 10-2021-0091957

(51) Int. Cl.
| | |
|---|---|
| *C08L 9/04* | (2006.01) |
| *A41D 19/00* | (2006.01) |
| *C08F 2/26* | (2006.01) |
| *C08F 220/06* | (2006.01) |
| *C08L 3/02* | (2006.01) |

(52) U.S. Cl.
CPC ............ *C08L 9/04* (2013.01); *A41D 19/0055* (2013.01); *C08F 2/26* (2013.01); *C08F 220/06* (2013.01); *C08L 3/02* (2013.01); *C08L 2201/06* (2013.01); *C08L 2201/52* (2013.01)

(58) Field of Classification Search
CPC ......... C08J 5/02; C08F 236/12; C08F 251/00; C08F 220/06; C08F 2/26; C08L 51/02; C08L 5/02; C08L 2201/52; C08L 2201/06; C08L 3/02; C08L 9/04; B29C 41/14; A41D 19/0058; A41D 19/0055; C08B 37/0021

See application file for complete search history.

(56) References Cited

U.S. PATENT DOCUMENTS

| | | | |
|---|---|---|---|
| 2012/0276399 A1 | 11/2012 | Evstatieva et al. | |
| 2015/0225553 A1 | 8/2015 | Yang et al. | |
| 2017/0327669 A1* | 11/2017 | Ng | ............................ A61F 6/04 |
| 2018/0201767 A1* | 7/2018 | Kim | ........................ C08L 3/02 |

FOREIGN PATENT DOCUMENTS

| | | |
|---|---|---|
| CN | 104169354 A | 11/2014 |
| CN | 107636032 A | 1/2018 |
| JP | 10-130598 A | 5/1998 |
| JP | 2018-505916 A | 3/2018 |
| JP | 2018-516282 A | 6/2018 |
| JP | 2022-183048 A | 12/2022 |
| KR | 10-2017-0060254 A | 6/2017 |
| KR | 10-2017-0094156 A | 8/2017 |
| KR | 10-2555290 B1 | 7/2023 |
| WO | 2016093689 A1 | 6/2016 |

OTHER PUBLICATIONS

Daud, J. Phys.: Conf. Ser. 1082 (2018) 012013, p. 1-6 (Year: 2018).*

* cited by examiner

*Primary Examiner* — Robert C Boyle
(74) *Attorney, Agent, or Firm* — NKL Law; Jae Youn Kim

(57) ABSTRACT

Provided is a method for preparing a latex composition for dip forming, the method including: (a) preparing a monomer mixture including a conjugated diene-based monomer, an ethylenically unsaturated nitrile monomer and an ethylenically unsaturated acid monomer; (b) introducing starch, an emulsifier and an inorganic solvent into the monomer mixture; and (c) preparing a copolymer latex by introducing a polymerization initiator, wherein the copolymer includes the starch in a main chain thereof.

9 Claims, 2 Drawing Sheets

METHOD FOR PREPARING BIODEGRADABLE LATEX COMPOSITION FOR DIP FORMING

CROSS-REFERENCE TO RELATED APPLICATION

This application claims priority to and the benefit of Korean Patent Application No. 10-2021-0091957, filed on Jul. 14, 2021, the disclosure of which is incorporated herein by reference in its entirety.

BACKGROUND

1. Field of the Invention

The present specification relates to a biodegradable latex composition for dip forming, a preparation method thereof and a dip-formed article prepared therefrom.

2. Discussion of Related Art

Natural rubber latex was a main raw material for gloves used for medical, agricultural and livestock product processing, and industrial use in the related art. However, when gloves made from natural rubber latex are used, a protein contained in the natural rubber latex frequently causes a problem in that a glove user suffers from a contact allergic disease. Thus, attempts have been made to manufacture gloves by applying a protein-free synthetic rubber latex such as a nitrile-based copolymer latex. Since nitrile-based copolymer latex gloves have better mechanical strength than natural rubber latex gloves, the demand for the nitrile-based copolymer latex gloves is increasing in the medical and food fields where contact with sharp objects frequently occurs.

However, since it are difficult to naturally decompose existing nitrile-based copolymer latex gloves after use, the latex gloves cause serious environmental pollution problems resulting from the waste disposal thereof. Therefore, there is an increasing social need for the development of a biodegradable nitrile-based copolymer latex glove which satisfies mechanical properties such as tensile strength and elongation required for latex gloves while exhibiting biodegradability in which it is possible to be naturally decomposed when landfilled.

Meanwhile, starch is one of the natural polymer materials that have been used by human beings for a long period of time, may be easily obtained due to its abundance on earth, is inexpensive, and may be used as a biodegradable material, but has a problem in that mechanical properties and processability are inferior compared to synthetic polymer materials.

SUMMARY OF THE INVENTION

The details described in the present specification have been made in an effort to solve the above-described problems in the related art, and an object of the present specification is to provide a method for preparing a latex composition for dip forming, which is capable of improving biodegradability by introducing starch into the main chain of a carboxylic acid-modified nitrile-based copolymer.

Another object of the present specification is to provide a latex composition for dip forming, which exhibits excellent mechanical properties such as tensile strength and elongation, and a dip-formed article prepared therefrom.

According to an aspect, provided is a method for preparing a latex composition for dip forming, the method including: (a) preparing a monomer mixture including a conjugated diene-based monomer, an ethylenically unsaturated nitrile monomer and an ethylenically unsaturated acid monomer; (b) introducing starch, an emulsifier and an inorganic solvent into the monomer mixture; and (c) preparing a copolymer latex by introducing a polymerization initiator, wherein the copolymer includes the starch in a main chain thereof.

In an exemplary embodiment, the conjugated diene-based monomer may be one selected from the group consisting of 1,3-butadiene, 2,3-dimethyl-1,3-butadiene, 2-ethyl-1,3-butadiene, 1,3-pentadiene, isoprene and a combination of two or more thereof.

In an exemplary embodiment, the ethylenically unsaturated nitrile monomer may be one selected from the group consisting of acrylonitrile, methacrylonitrile, fumaronitrile, α-chloronitrile, α-cyano ethyl acrylonitrile and a combination of two or more thereof.

In an exemplary embodiment, the ethylenically unsaturated acid monomer may be one selected from the group consisting of methacrylic acid, acrylic acid, itaconic acid, maleic acid, fumaric acid, anhydrous maleic acid, anhydrous citraconic acid, styrenesulfonic acid, monobutyl fumarate, monobutyl maleate, mono-2-hydroxypropyl maleate and a combination of two or more thereof.

In an exemplary embodiment, the starch may be one selected from the group consisting of natural starch, a derivative of the natural starch, amylose extracted from the natural starch, modified starch, dextrin and a combination of two or more thereof.

In an exemplary embodiment, a dextrose equivalent of the dextrin may be 10 to 25.

In an exemplary embodiment, a molecular weight of the dextrin may be 1,000 to 10,000 g/mol.

In an exemplary embodiment, a content of the starch may be 0.5 to 10 parts by weight with respect to 100 parts by weight of the monomer mixture.

According to another aspect, provided is a latex composition for dip forming, which is prepared by the method for preparing a latex composition for dip forming.

According to still another aspect, provided is a dip-formed article, which is prepared by dip-forming the latex composition for dip forming.

In an exemplary embodiment, the dip-formed article may be one selected from the group consisting of medical gloves, gloves for processing agricultural and livestock products, and industrial gloves.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
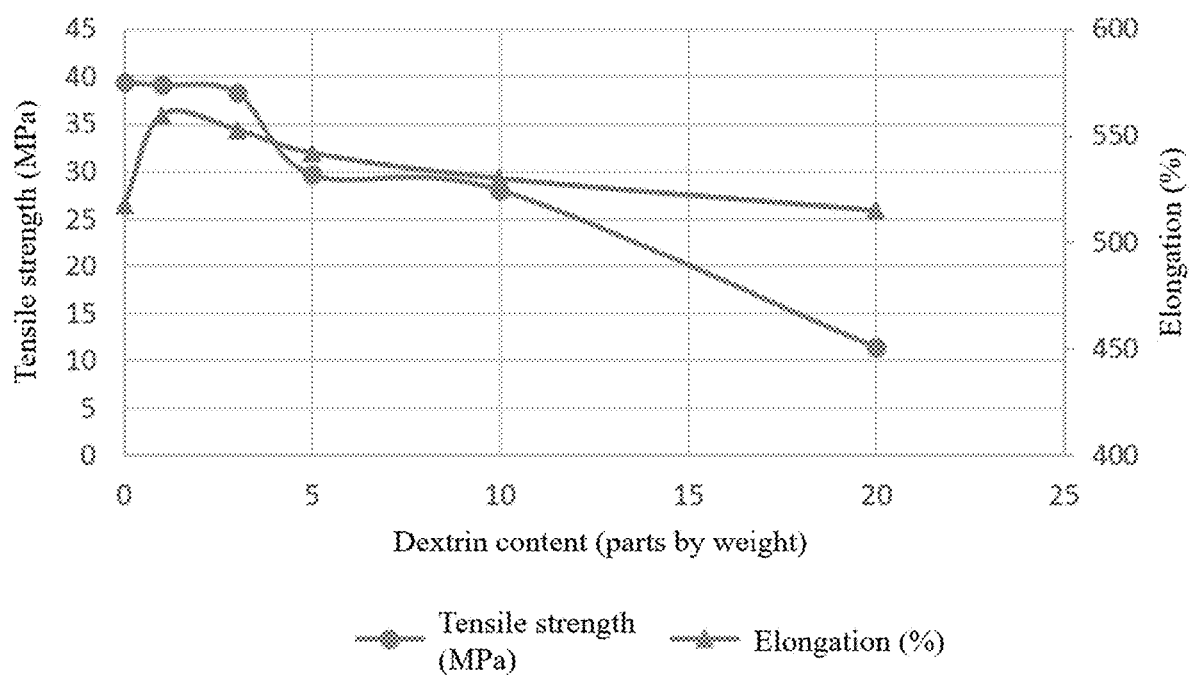
FIG. 1 illustrates the results of evaluating the mechanical properties of a test piece according to the dextrin content.

Hereinafter, an aspect of the present specification will be described with reference to the accompanying drawings.

However, the description of the present specification may be implemented in various different forms, and is therefore not limited to exemplary embodiments described herein. In addition, in order to clearly describe an aspect of the present specification, portions that are not related to the description are omitted in the drawings, and like reference numerals are added to like portions throughout the specification.

Throughout the specification, when one part is "connected" to another part, this includes not only a case where they are "directly connected to each other", but also a case where they are "indirectly connected to each other" with another member interposed therebetween. Further, when one part "includes" one constituent element, unless otherwise specifically described, this does not mean that another constituent element is excluded, but means that another constituent element may be further included.

When a range of numerical values is described in the present specification, the value has the precision of significant figures provided according to the standard rules in chemistry for significant figures, unless a specific range thereof is stated otherwise. For example, 10 includes a range of 5.0 to 14.9, and the number 10.0 includes a range of 9.50 to 10.49.

Hereinafter, an exemplary embodiment of the present specification will be described in detail with reference to the accompanying drawings.

Method for Preparing Latex Composition for Dip Forming

A method for preparing a latex composition for dip forming according to an aspect of the present specification may include: (a) preparing a monomer mixture including a conjugated diene-based monomer, an ethylenically unsaturated nitrile monomer and an ethylenically unsaturated acid monomer; (b) introducing starch, an emulsifier and an inorganic solvent into the monomer mixture; and (c) preparing a copolymer latex by introducing a polymerization initiator.

The copolymer may include the starch in the main chain thereof. A latex composition for dip forming, which is prepared by the preparation method, and a dip-formed article prepared by dip forming the same may exhibit excellent biodegradability by introducing starch into the main chain of a copolymer.

The starch may be introduced into the main chain of the copolymer through the following mechanism. The starch is a natural starch represented by the following Chemical Formula 1:

[Chemical Formula 1]

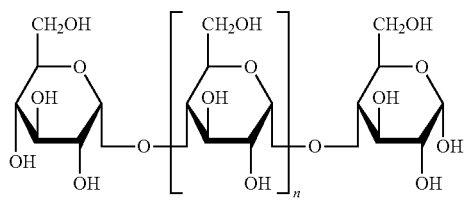

A hydroxy group (starch-OH) present in the starch may react with a free radical formed from the polymerization initiator to cause an initiation reaction. A radical (starch-O) formed in starch through the initiation reaction may transfer radicals to a new end while binding to another starch or another monomer included in the monomer mixture, and by repeating such a reaction to grow the chain, a copolymer containing the starch in the main chain may be finally formed The copolymer may be a copolymer of a conjugated diene-based monomer, an ethylenically unsaturated nitrile monomer, an ethylenically unsaturated acid monomer, and starch, but is not limited thereto.

Step (a) is a step of preparing a monomer mixture including a conjugated diene-based monomer, an ethylenically unsaturated nitrile monomer and an ethylenically unsaturated acid monomer, which are monomers constituting a carboxylic acid-modified nitrile-based copolymer.

The monomer mixture may include 50 to 98 wt % of a conjugated diene-based monomer, 1 to 49 wt % of an ethylenically unsaturated nitrile monomer, and 1 to 10 wt % of an ethylenically unsaturated acid monomer, based on the total weight of the monomer mixture. When the content of each monomer included in the monomer mixture is out of the above range, the formed article may be excessively softened or excessively hardened, so a user of the dip-formed article may have decreased wearing comfort, or the oil resistance of the dip-formed article may be degraded and the tensile strength may be reduced.

The conjugated diene-based monomer may be one selected from the group consisting of 1,3-butadiene, 2,3-dimethyl-1,3-butadiene, 2-ethyl-1,3-butadiene, 1,3-pentadiene, isoprene and a combination of two or more thereof, and may be, for example, 1,3-butadiene, but is not limited thereto.

The ethylenically unsaturated nitrile monomer may be one selected from the group consisting of acrylonitrile, methacrylonitrile, fumaronitrile, α-chloronitrile, α-cyano ethyl acrylonitrile and a combination of two or more thereof, and may be, for example, acrylonitrile, but is not limited thereto.

The ethylenically unsaturated acid monomer may be one selected from the group consisting of methacrylic acid, acrylic acid, itaconic acid, maleic acid, fumaric acid, anhydrous maleic acid, anhydrous citraconic acid, styrenesulfonic acid, monobutyl fumarate, monobutyl maleate, mono-2-hydroxypropyl maleate and a combination of two or more thereof, and may be, for example, methacrylic acid, but is not limited thereto.

Step (b) is a step of preparing for emulsion polymerization by introducing starch, an emulsifier and an inorganic solvent into the monomer mixture, and the biodegradability of latex may be improved by adding starch.

The starch may be one selected from the group consisting of natural starch, a derivative of the natural starch, amylose extracted from the natural starch, modified starch, dextrin and a combination of two or more thereof, and may be, for example, dextrin, but is not limited thereto.

The natural starch may be one selected from the group consisting of normal corn starch, waxy corn starch, high amylose corn starch, rice starch, waxy rice starch, high amylose rice starch, potato starch, sweet potato starch, tapioca starch, sorghum starch, wheat starch, sago starch, chestnut starch, bean starch and a combination of two or more thereof, but is not limited thereto.

The modified starch may be one selected from the group consisting of hydroxypropyl starch, starch phosphate, oxidized starch, pregelatinized starch, octenyl succinic acid-substituted starch, starch acetate and a combination of two or more thereof, but is not limited thereto.

The dextrin is a low molecular weight carbohydrate obtained by hydrolyzing starch, may be obtained by hydrolyzing natural starch with an acid, heat, an enzyme, and the like, and may be purchased and used commercially. The acid used for the hydrolysis may be hydrochloric acid, sulfuric acid, nitric acid or acetic acid, but is not limited thereto. The enzyme can be any enzyme as long as it has the ability to hydrolyze starch, and may be, for example, one selected from the group consisting of alpha-amylase, beta-amylase, glucoamylase, amyloglucosidase, isoamylase, pullulanase, alpha-glucosidase and a combination of two or more thereof, but is not limited thereto.

The dextrose equivalent of the dextrin may be 10 to 25, and may be, for example, 10, 11, 12, 13, 14, 15, 16, 17, 18, 19, 20, 21, 22, 23, 24, 25 or a value between two values thereof. When the dextrose equivalent of the dextrin is less than 10, the quality and texture of the formed article may deteriorate because a latex gelation phenomenon occurs during polymerization, and when the dextrose equivalent of the dextrin exceeds 25, viscosity may be decreased and browning may occur, and when the dextrose equivalent of the dextrin is out of the above range, mechanical properties such as tensile strength and elongation of the formed article may deteriorate.

The dextrin may have a molecular weight of 1,000 to 10,000 g/mol, but the molecular weight is not limited thereto.

A content of the starch may be 0.5 to 10 parts by weight with respect to 100 parts by weight of the monomer mixture. For example, the content of the starch may be 0.5 parts by weight, 1 part by weight, 1.5 parts by weight, 2 parts by weight, 2.5 parts by weight, 3 parts by weight, 3.5 parts by weight, 4 parts by weight, 4.5 parts by weight, 5 parts by weight, 5.5 parts by weight, 6 parts by weight, 6.5 parts by weight, 7 parts by weight, 7.5 parts by weight, 8 parts by weight, 8.5 parts by weight, 9 parts by weight, 9.5 parts by weight, 10 parts by weight or a value between two values thereof with respect to 100 parts by weight of the monomer mixture. When the content of the starch is less than 0.5 parts by weight with respect to 100 parts by weight of the monomer mixture, the biodegradability and elongation of the formed article may deteriorate because the content of starch introduced into the main chain of the copolymer is decreased, and when the content exceeds 10 parts by weight, the mechanical properties such as tensile strength and elongation and product quality of the formed article may deteriorate because the content of starch introduced into the main chain of the copolymer is excessively increased.

The emulsifier may be an ionic surfactant, but is not limited thereto. For example, the emulsifier may be one selected from the group consisting of an anionic surfactant, a cationic surfactant, an amphoteric surfactant and a combination of two or more thereof.

The emulsifier may be one selected from the group consisting of an alkylbenzene sulfonate, an alkyldiphenyloxide disulfonate, an aliphatic sulfonate, a sulfate ester of a higher alcohol, an α-olefin sulfonate, an alkyl ether sulfate ester salt and a combination of two or more thereof, and may include, for example, sodium dodecylbenzene sulfonate and disodium alkyl diphenyloxide sulfonate, but is not limited thereto. By using an emulsifier including sodium dodecylbenzene sulfonate and disodium alkyl diphenyloxide sulfonate, it is possible to prevent the solidification of the monomer mixture and the starch, increase the conversion rate of the polymerization reaction, and improve the mechanical stability, chemical stability and polymerization stability of the latex composition. The content of the emulsifier may be 0.1 to 5 parts by weight with respect to 100 parts by weight of the monomer mixture.

The inorganic solvent may be water, and may be, for example, ion exchanged water, but is not limited thereto.

Step (b) may further include adding a molecular weight adjuster. The molecular weight adjuster may be one selected from the group consisting of mercaptans such as α-methylstyrene dimers, t-dodecyl mercaptan, n-dodecyl mercaptan, and octyl mercaptan; halogenated hydrocarbons such as carbon tetrachloride, methylene chloride and methylene bromide; sulfur-containing compounds such as tetraethylthiuram disulfide, dipentamethylenethiuram disulfide and diisopropylxanthogen disulfide, and a combination of two or more thereof, and may be, for example, t-dodecyl mercaptan, but is not limited thereto. The content of the molecular weight adjuster may be 0.1 to 1.0 part by weight with respect to 100 parts by weight of the monomer mixture.

Step (c) is a step of preparing a copolymer latex by introducing a polymerization initiator, and may include: polymerizing the monomer mixture by introducing a polymerization initiator; stopping the polymerization by introducing a polymerization terminator; and obtaining a copolymer latex by removing an unreacted monomer and adjusting the solid concentration and the pH.

The polymerization initiator may be one selected from the group consisting of an inorganic peroxide such as sodium persulfate, potassium persulfate, ammonium persulfate, potassium perphosphate, and hydrogen peroxide; an organic peroxide such as t-butylperoxide, cumene hydroperoxide, p-menthane hydroperoxide, di-t-butyl peroxide, t-butylcumyl peroxide, acetyl peroxide, isobutyryl peroxide, octanoyl peroxide, benzoyl peroxide, 3,5,5-trimethylhexanoyl peroxide, and t-butylperoxy isobutyrate; azobisisobutyronitrile, azobis-2,4-dimethylvaleronitrile, azobis cyclohexanecarbonitrile, methyl azobisisolactate (butyrate) and a combination of two or more thereof, and may be, for example, potassium peroxodisulfate, but is not limited thereto. Radicals may be formed in the starch using the polymerization initiator, and accordingly, the biodegradability of the latex composition may be improved by introducing the starch into the main chain of the copolymer. The content of the polymerization initiator may be 0.02 to 1.5 parts by weight with respect to 100 parts by weight of the monomer mixture.

The polymerization in Step (c) may be performed by including an activator, and the activator may be one selected from the group consisting of sodium formaldehyde sulfoxylate, sodium ethylenediamine tetraacetate, ferrous sulfate, dextrose, sodium pyrrolinate, sodium sulfite and a combination of two or more thereof, and may be, for example, sodium formaldehyde sulfoxylate, but is not limited thereto. The content of the activator may be 0.01 to 0.3 parts by weight with respect to 100 parts by weight of the monomer mixture. The polymerization in Step (c) may be performed at 10 to 90° C., and may be performed at 10° C., 15° C., 20° C., 25° C., 30° C., 35° C., 40° C., 45° C., 50° C., 55° C., 60° C., 65° C., 70° C., 75° C., 80° C., 85° C., 90° C. or a temperature between two temperatures thereof.

The polymerization terminator may be introduced when the conversion rate of the polymerization reaction is 90% or more, and for example, the polymerization terminator may be introduced when the conversion rate of the polymerization reaction is 90%, 91%, 92%, 93%, 94%, 95%, 96%, 97%, 98%, 99%, 99.9% or a value between two values thereof.

The polymerization terminator may be one selected from the group consisting of hydroxylamine, hydroxylamine sulfate, diethylhydroxyamine, hydroxylaminesulfonic acid and an alkali metal ion thereof, sodium dimethyldithiocarbamate, a hydroquinone derivative, an aromatic hydroxydithiocarboxylic acid such as hydroxydiethylbenzenedithiocarboxylic acid and hydroxydibutylbenzenedithiocarboxylic acid, and a combination of two or more thereof, and may be, for example, sodium dimethyldithiocarbamate, but is not limited thereto. The content of the polymerization terminator may be 0.02 to 1.5 parts by weight with respect to 100 parts by weight of the monomer mixture.

The solid concentration and pH of the copolymer latex may be adjusted by introducing an additive such as a pH adjuster, an antioxidant, and an antifoaming agent.

The pH adjuster may be an aqueous potassium hydroxide solution or aqueous ammonia, but is not limited thereto.

The copolymer latex has a solid concentration of 30 to 60%, for example, 30%, 32%, 34%, 36%, 38%, 40%, 42%, 44%, 46%, 48%, 50%, 52%, 54%, 56%, 58%, 60% or a range between two values thereof, and the pH may be adjusted to 7 to 12, for example, 7.0, 7.5, 8.0, 8.5, 9.0, 9.5, 10.0, 10.5, 11.0, 11.5, 12.0 or a range between two values thereof, but is not limited thereto.

The copolymer latex has excellent mechanical stability, biodegradability and polymerization stability, and thus may be applied to the preparation of an eco-friendly and stable latex composition for dip forming.

The method for preparing a latex composition for dip forming may further include: (d) preparing a latex composition for dip forming by introducing a vulcanizing agent, a vulcanization accelerator and a cross-linking agent into the copolymer latex.

The vulcanizing agent may include sulfur such as powdered sulfur, precipitated sulfur, colloidal sulfur, surface-treated sulfur, and insoluble sulfur. Since such a vulcanizing agent attacks a pi bond in the conjugated double bond of butadiene to cross-link between the polymer chains, it is possible to impart elasticity to the copolymer and to improve the chemical resistance of the dip-formed article. The content of the vulcanizing agent may be 0.1 to 3.0 parts by weight with respect to 100 parts by weight of the copolymer latex.

The vulcanization accelerator may be one selected from the group consisting of 2-mercaptobenzothiazole, 2,2-dithiobisbenzothiazole-2-sulfenamide, N-cyclohexylbenzothiazole-2-sulfenamide, 2-morpholinothiobenzothiazole, tetramethylthiuram monosulfide, tetramethylthiuram disulfide, zinc diethyldithiocarbamate, zinc dibutyldithiocarbamate, diphenylguanidine, di-o-tolylguanidine and a combination of two or more thereof, and may be, for example, zinc dibutyldithiocarbamate, but is not limited thereto. The content of the vulcanization accelerator may be 0.1 to 3.0 parts by weight with respect to 100 parts by weight of the copolymer latex.

The cross-linking agent may be zinc oxide, but is not limited thereto. The content of the cross-linking agent may be 0.1 to 3.0 parts by weight with respect to 100 parts by weight of the copolymer latex.

Latex Composition for Dip Forming

The latex composition for dip forming according to another aspect of the present specification may be prepared by the method for preparing a latex composition for dip forming.

The latex composition for dip forming has a solid concentration of 10 to 30%, for example, 10%, 12%, 14%, 16%, 18%, 20%, 22%, 24%, 26%, 28%, 30% or a range between two values thereof, and the pH may be adjusted to 9 to 11, for example, 9.0, 9.5, 10.0, 10.5, 11.0 or a range between two values thereof, but is not limited thereto.

Dip-Formed Article

The dip-formed article according to still another aspect of the present specification may be prepared by dip forming the latex composition for dip forming.

The dip-formed article has excellent mechanical properties such as tensile strength and elongation, has a low defect rate, and has excellent quality such as sense of touch, and thus may be applied to dip-formed articles in various fields.

The dip-formed article exhibits biodegradability, and thus may be applied to eco-friendly dip-formed articles in various fields, which are naturally decomposed after use.

The dip-formed article may be one selected from the group consisting of medical gloves, gloves for processing agricultural and livestock products, and industrial gloves, but is not limited thereto.

Hereinafter, the examples of the present invention will be described in more detail. However, the following experimental results describe only representative experimental results among the above-mentioned examples, and the scope and contents of the present specification should not be interpreted as being reduced or limited by the examples, and the like. The effects of each of various embodiments of the present specification, which are not explicitly set forth below, will be described in detail in a corresponding section.

Example 1

A 10-L high pressure reactor equipped with a stirrer, a thermometer, a cooler, and a nitrogen gas inlet and installed so as to continuously introduce each component such as a monomer, an emulsifier, and a polymerization initiator was prepared. After the reactor was substituted with nitrogen, a monomer mixture including 65 wt % of 1,3-butadiene, 30 wt % of acrylonitrile and 5 wt % of methacrylic acid based on the total weight of the mixture was introduced into the reactor. Thereafter, 1 part by weight of dextrin (SAMYANG CORPORATION) having a molecular weight of 1,000 to 10,000 g/mol and a dextrose equivalent (DE) of 18, 2 parts by weight of sodium dodecylbenzene sulfonate (SDBS), 1 part by weight of disodium alkyl diphenyloxide sulfonate (DPOS), 0.5 parts by weight of t-dodecyl mercaptan, and 120 parts by weight of ion exchanged water with respect to 100 parts by weight of the monomer mixture were introduced into the reactor. After the temperature of the reactor was increased to about 25° C., 0.3 parts by weight of potassium persulfate was added.

When the conversion rate reached about 95%, 0.1 parts by weight of sodium dimethyldithiocarbamate was added to terminate the polymerization reaction. Thereafter, a carboxylic acid-modified nitrile-based copolymer latex having a solid concentration of 45% and a pH of 8.5 was obtained by removing an unreacted monomer and the like through a deodorizing process and adding aqueous ammonia, an antioxidant, an antifoaming agent and the like.

Example 2

A carboxylic acid-modified nitrile-based copolymer latex was obtained in the same manner as in Example 1, except that 3 parts by weight of dextrin was added.

Example 3

A carboxylic acid-modified nitrile-based copolymer latex was obtained in the same manner as in Example 1, except that 5 parts by weight of dextrin was added.

Example 4

A carboxylic acid-modified nitrile-based copolymer latex was obtained in the same manner as in Example 1, except that 10 parts by weight of dextrin was added.

Example 5

A carboxylic acid-modified nitrile-based copolymer latex was obtained in the same manner as in Example 1, except that dextrin having a dextrose equivalent of 12 was used.

Example 6

A carboxylic acid-modified nitrile-based copolymer latex was obtained in the same manner as in Example 1, except that dextrin having a dextrose equivalent of 22 was used.

Comparative Example 1

A carboxylic acid-modified nitrile-based copolymer latex was obtained in the same manner as in Example 1, except that dextrin was not added.

Comparative Example 2

A carboxylic acid-modified nitrile-based copolymer latex was obtained in the same manner as in Example 1, except that 20 parts by weight of dextrin was added.

Comparative Example 3

A carboxylic acid-modified nitrile-based copolymer latex was obtained in the same manner as in Example 1, except that dextrin having a dextrose equivalent of 8 was used.

Comparative Example 4

A carboxylic acid-modified nitrile-based copolymer latex was obtained in the same manner as in Example 1, except that dextrin having a dextrose equivalent of 30 was used.

Preparation Example

A latex composition for dip forming, the composition having a solid concentration of 18% and a pH of 10.0, was prepared by adding 1.0 part by weight of sulfur, 1.4 parts by weight of zinc oxide and 0.6 parts by weight of zinc dibutyldithiocarbamate (ZDBC) to 100 parts by weight of each carboxylic acid-modified nitrile-based copolymer latex prepared according to Examples 1 to 6 and Comparative Examples 1 to 4 and adding a 4% aqueous potassium hydroxide solution and secondary distilled water.

Experimental Example 1: Evaluation of Mechanical Properties

A dumbbell-shaped test piece was produced in accordance with ASTM D-412 from each latex composition for dip forming prepared according to the Preparation Example. Mechanical properties were evaluated by pulling the test piece at an elongation speed of 500 mm/min and measuring tensile strength and elongation at break, 300% modulus and 500% modulus using a universal testing machine (UTM). Typically, the higher the tensile strength and elongation of a latex-formed article, the better the evaluation of dip quality.

The following Table 1 shows the results of evaluating the mechanical properties of test pieces produced from the latexes of Examples 1 to 4 and Comparative Examples 1 and 2.

TABLE 1

| Classification | Dextrin (parts by weight) | 300% Modulus (MPa) | 500% Modulus (MPa) | Tensile strength (MPa) | Elongation (%) |
|---|---|---|---|---|---|
| Comparative Example 1 | 0 | 5.9 | 33.7 | 39.4 | 518 |
| Example 1 | 1 | 4.1 | 23.2 | 39.1 | 560 |
| Example 2 | 3 | 4.2 | 24.2 | 38.3 | 553 |
| Example 3 | 5 | 3.6 | 20.6 | 29.7 | 542 |
| Example 4 | 10 | 3.8 | 21.6 | 28.1 | 530 |
| Comparative Example 2 | 20 | 1.8 | 10.1 | 11.5 | 515 |

Referring to Table 1 and FIG. 1, it can be confirmed that the elongations of the test pieces produced from the latexes of Examples 1 to 4 are excellent compared to the test piece produced from the latex of Comparative Example 1, and the tensile strength also maintains the physical properties of Comparative Example 1. These results show that when starch is introduced into the main chain of the copolymer by adding starch in the polymerization step of the nitrile-based copolymer latex, the mechanical properties and dip quality of the formed article are maintained or improved.

However, it was confirmed that in the case of Comparative Example 2 in which the content of dextrin is 20 parts by weight with respect to 100 parts by weight of the monomer mixture, the tensile strength and elongation were reduced, and thus failed to satisfy the mechanical properties of the test piece produced from the latex of Comparative Example 1.

The following Table 2 shows the results of evaluating the mechanical properties of test pieces produced from the latexes of Examples 1, 5 and 6 and Comparative Examples 3 and 4.

TABLE 2

| Classification | Dextrose equivalent | 300% Modulus (MPa) | 500% Modulus (MPa) | Tensile strength (MPa) | Elongation (%) |
|---|---|---|---|---|---|
| Comparative Example 3 | 8 | 9.1 | — | 28.1 | 430 |
| Example 5 | 12 | 4.5 | 25.4 | 38.2 | 547 |
| Example 1 | 18 | 4.1 | 22.8 | 39.1 | 560 |
| Example 6 | 22 | 3.6 | 20.6 | 38.5 | 572 |
| Comparative Example 4 | 30 | 4.6 | 26.4 | 32.3 | 523 |

Figure 2:
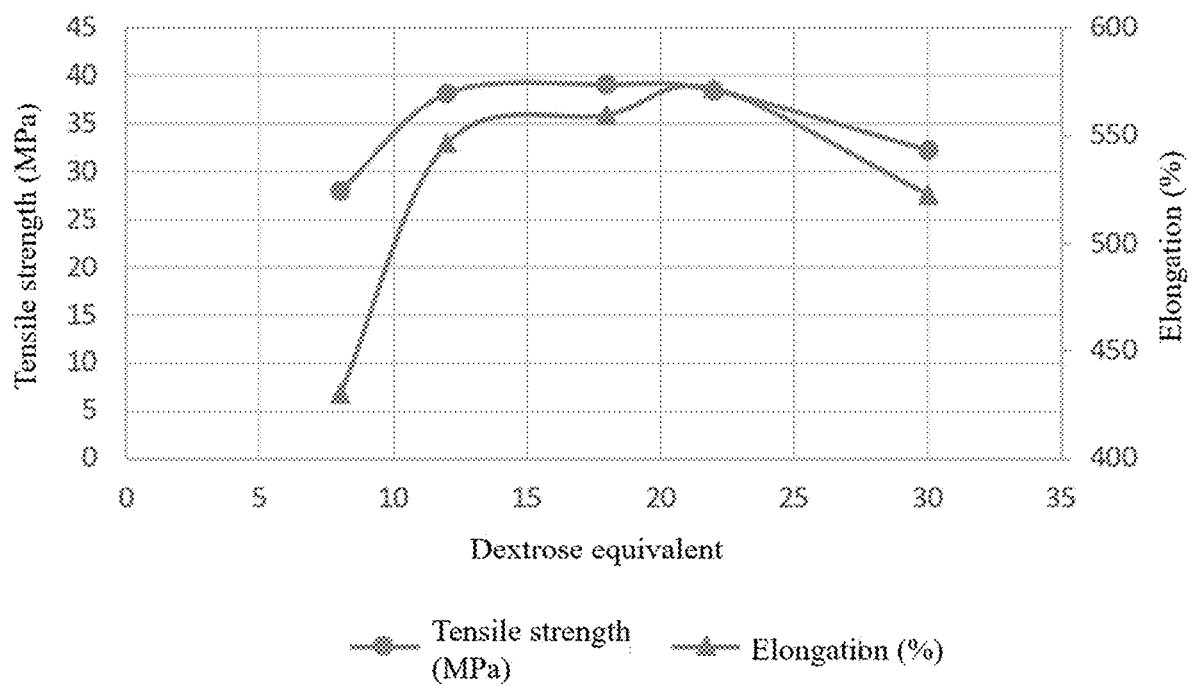
FIG. 2 illustrates the results of evaluating the mechanical properties of the test piece according to the dextrose equivalent of dextrin.

Referring to Table 2 and FIG. 2, it can be confirmed that the tensile strengths and elongations of the test pieces produced from the latexes of Examples 1, 5 and 6 are excellent compared to the test pieces produced from the latexes of Comparative Examples 1 and 4.

These results show that the mechanical properties and dip quality of the formed article may be improved by adjusting the dextrose equivalent of starch added in the polymerization step of the nitrile-based copolymer latex.

Experimental Example 2: Evaluation of Biodegradability

One type of bacterial inoculum was added to the carboxylic acid-modified nitrile-based copolymer latexes of Example 1 and Comparative Example 1 in an amount of 10% based on the mass of the latex and stored at 30° C. for 4 days, and then the number of proliferated microorganisms was measured. Thereafter, additional secondary and tertiary re-inoculations were performed, and after storage at 30° C. for 2 days from each re-inoculation date, the number of naturally propagated bacteria was measured.

The following Table 3 shows the results of bacterial decomposition experiments on the carboxylic acid-modified nitrile copolymer latexes of Example 1 and Comparative Example 1.

TABLE 3

| Classification | 4 days after primary inoculation | 2 days after secondary inoculation | 2 days after tertiary inoculation |
|---|---|---|---|
| Example 1 | $1.0 \times 10^2$ cfu/ml | ND | TNTC |
| Comparative Example 1 | ND | ND | ND |

ND: Not detected (less than 100 cfu/ml)
TNTC: Too numerous to count ($10^5$ cfu/ml or more)

Referring to Table 3, it was confirmed that in the case of the latex of Comparative Example 1 in which starch was not added in the polymerization step, no bacteria were detected after the primary, secondary and tertiary inoculations, while in the copolymer latex of Example 1, including dextrin in the main chain thereof, bacteria propagated 4 days after the primary inoculation were detected, and 2 days after the tertiary inoculation, $10^5$ cfu/ml or more of bacteria were naturally propagated, and thus a decomposition rate was high. These results show that when starch is introduced into the main chain of the copolymer by adding starch in the polymerization step of the nitrile-based copolymer latex, biodegradability is imparted to the latex.

The method for preparing a latex composition for dip forming according to an aspect of the present specification can be applied to the preparation of a latex composition for dip forming in which biodegradability is improved by introducing starch into the main chain of a carboxylic acid-modified nitrile-based copolymer.

The latex composition for dip forming and the dip-formed article according to another aspect of the present specification have excellent mechanical properties such as tensile strength and elongation, and exhibit biodegradability, and thus can be widely applied to the manufacture of medical gloves, gloves for processing agricultural and livestock products, industrial gloves, and the like.

The effect of an aspect of the present specification is not limited to the aforementioned effects, and it should be understood to include all possible effects deduced from the configuration described in the detailed description or the claims of the present specification.

The above-described description of the present specification is provided for illustrative purposes, and those skilled in the art to which an aspect of the present specification pertains will understand that the present specification can be easily modified into other specific forms without changing the technical spirit or essential features described in the present specification. Therefore, it should be understood that the above-described examples are only illustrative in all aspects and not restrictive. For example, each constituent element which is described as a singular form may be implemented in a distributed form, and similarly, constituent elements which are described as being distributed may be implemented in a combined form.

The scope of the present specification is represented by the following claims, and it should be interpreted that the meaning and scope of the claims and all the changes or modified forms derived from the equivalent concepts thereof fall within the scope of the present specification.

What is claimed is:

1. A method for preparing a latex composition for dip forming,
   the method comprising:
   (a) preparing a raw monomer mixture comprising a conjugated diene-based monomer, an ethylenically unsaturated nitrile monomer and an ethylenically unsaturated acid monomer;
   (b) generating a modified monomer mixture by introducing starch, an emulsifier and an inorganic solvent into the raw monomer mixture; and
   (c) preparing a copolymer latex by introducing a polymerization initiator into the modified monomer mixture,
   wherein the copolymer latex comprises the starch in a main chain thereof,
   wherein the starch is dextrin, and
   wherein a dextrose equivalent of the dextrin is 10 to 25.

2. The method of claim 1, wherein the conjugated diene-based monomer is one selected from the group consisting of 1,3-butadiene, 2,3-dimethyl-1,3-butadiene, 2-ethyl-1,3-butadiene, 1,3-pentadiene, isoprene and a combination of two or more thereof.

3. The method of claim 1, wherein the ethylenically unsaturated nitrile monomer is one selected from the group consisting of acrylonitrile, methacrylonitrile, fumaronitrile, α-chloronitrile, α-cyano ethyl acrylonitrile and a combination of two or more thereof.

4. The method of claim 1, wherein the ethylenically unsaturated acid monomer is one selected from the group consisting of methacrylic acid, acrylic acid, itaconic acid, maleic acid, fumaric acid, anhydrous maleic acid, anhydrous citraconic acid, styrenesulfonic acid, monobutyl fumarate, monobutyl maleate, mono-2-hydroxypropyl maleate and a combination of two or more thereof.

5. The method of claim 1, wherein the dextrin has a molecular weight of 1,000 to 10,000 g/mol.

6. The method of claim 1, wherein a content of the starch is 0.5 to 10 parts by weight with respect to 100 parts by weight of the raw monomer mixture.

7. A latex composition for dip forming prepared by the method of claim 1.

8. A dip-formed article prepared by dip forming the latex composition of claim 7.

9. The dip-formed article of claim 8, wherein the dip-formed article is one selected from the group consisting of medical gloves, gloves for processing agricultural and livestock products, and industrial gloves.

* * * * *